D. L. POTTER.
COMPOUND RECOIL SPRING FOR VEHICLES.
APPLICATION FILED JAN. 4, 1913.
1,110,230.
Patented Sept. 8, 1914.
2 SHEETS—SHEET 1.
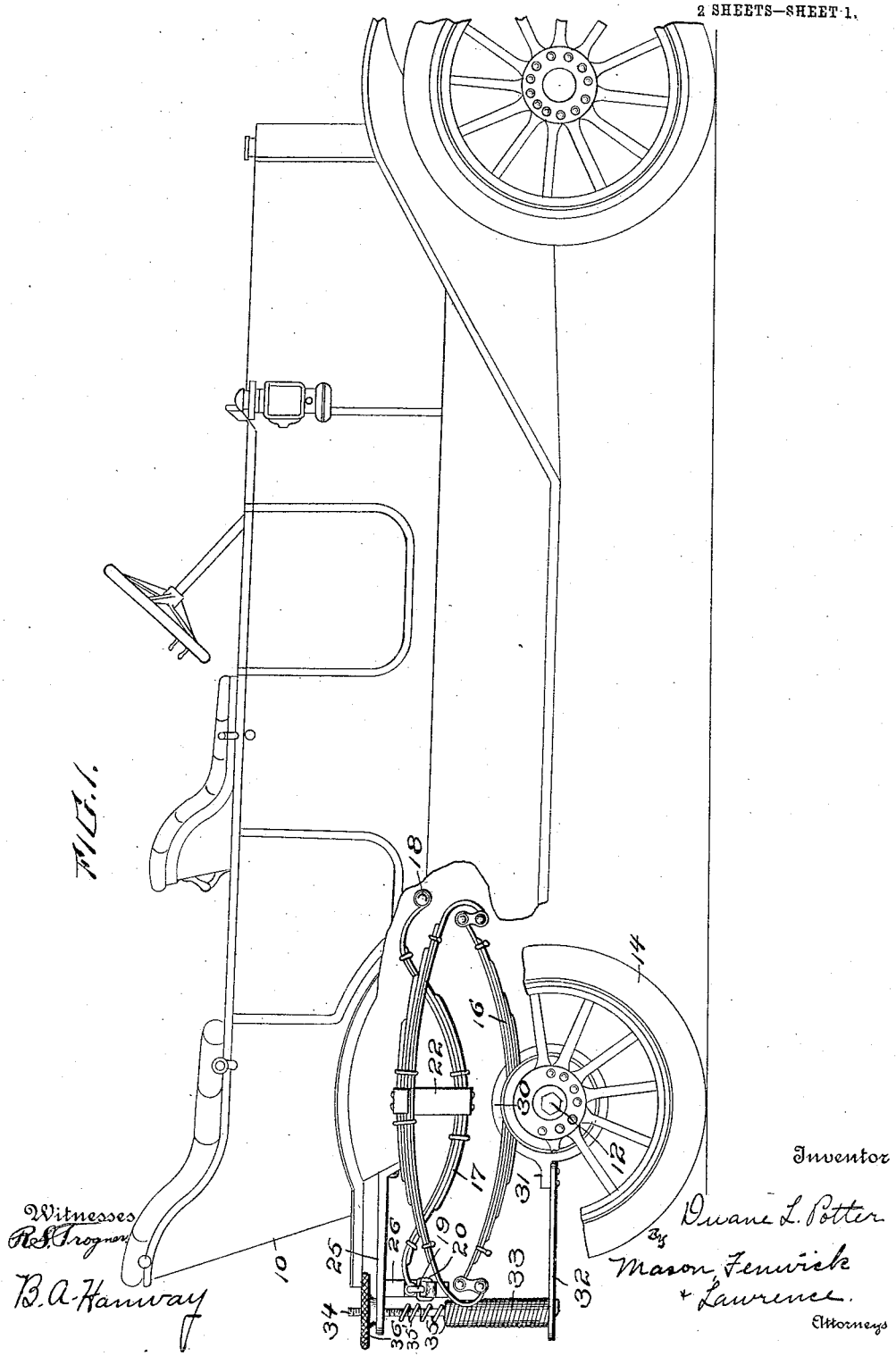

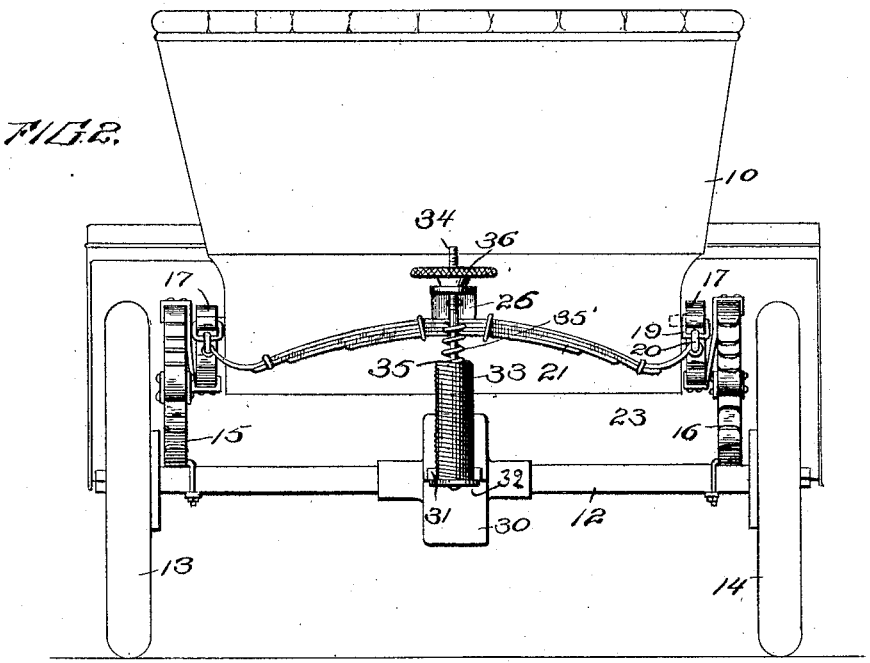

UNITED STATES PATENT OFFICE.

DUANE L. POTTER, OF SCRANTON, PENNSYLVANIA.

COMPOUND RECOIL-SPRING FOR VEHICLES.

1,110,230.  Specification of Letters Patent.  Patented Sept. 8, 1914.

Application filed January 4, 1913. Serial No. 740,251.

*To all whom it may concern:*

Be it known that I, DUANE L. POTTER, citizen of the United States, residing at Scranton, in the county of Lackawanna and State of Pennsylvania, have invented certain new and useful Improvements in Compound Recoil-Springs for Vehicles; and I do hereby declare the following to be a full, clear, and exact description of the invention, such as will enable others skilled in the art to which it appertains to make and use the same.

This invention relates to compound recoil springs for vehicles.

In carrying out my invention, I provide in connection with each of the usual elliptical leaf springs a curved leaf spring which may be termed a platform spring, and which has connection directly with the body at one end, the central portion being connected with the elliptical spring, and the rear end with a spring extending transversely of the body portion at the rear thereof. Coöperating with the springs above mentioned is a coil spring which may be mounted vertically and provided with adjustable means, this spring last mentioned being especially designed to provide, by increasing or decreasing its tension, for the varying intensity of the rebound when traveling over an uneven surface and when traveling over a comparatively smooth road way.

In the accompanying drawings forming part of this application: Figure 1 is a side elevation of an automobile body with my invention applied thereto. Fig. 2 is a rear elevation. Fig. 3 is a top plan view of a portion of the construction.

Referring to the drawings in detail, 10 indicates the body of an automobile or other vehicle, 12 the rear axle thereof, and 13 and 14 the rear wheels, carried by said axle. Mounted upon the axle is a pair of elliptical springs, one of these being designated 15 and the other 16. The springs are located between the sides of the body and the rear wheels, and normally about one-half of the said springs may project above the bottom of the body.

Connected with each elliptical spring is a curved spring 17, one end of which is connected with the body by a pin 18, and the opposite end of which is connected with a link 19, the latter in turn having connection with link 20 carried by a leaf spring 21 extending across the rear of the body. Spring 17 has connection with the upper portion of the elliptical spring by means of a hanger or spacing member 22. This spring, or the central portion thereof, is normally located about midway between the upper and lower portions of the elliptical springs above mentioned.

The spring 21 extending across the rear of the body is carried by a special form of bracket 25 connected with the body in any suitable manner. Projecting downwardly from one end of the body is a lug or other member 26 having rigid connection with the central portion of spring 21.

A collar 30 is carried by the axle 12, and has formed thereon a lug 31, connected with which is a resilient device 32 which serves to support the lower end of coil spring 33. Bracket 25 is provided with an aperture near its extreme end, and a threaded rod 34 projects through the said aperture and has rigid connection with the upper end 35 of the coil spring. An independent coil spring 35′ may encircle rod 34 and be located between the upper end of spring 33 and the end of bracket 25.

In order to provide for the adjustment of the device, a threaded member which may be in the form of a wheel is mounted above the bracket and is designated 36. It will be understood that the operation of member 36 will increase or diminish the tension of spring 33 and of the other springs.

The action of springs 16 and 17, which may be termed compound springs, is modified by adjusting their position or tension through or by means of spring 33, in order to hold them somewhat below their normal tension. In a severe shock the body of the car does not descend far before it is mildly checked by the first action of spring 33, which becomes stronger as the body descends and until the movement of the latter is arrested. In the reverse action, or rebound, spring 33 soon comes into action, its tension increasing until the ascension is fully arrested by the time the compound springs 16 and 17 have gained their normal position. At this point the tension of spring 33 has become so strong that the compound springs can not throw the body any higher without lifting the rear of the machine or the wheels from the ground. Thus the compound springs are governed by the action of spring 33 which acts mildly at first but becomes more rigid when there is a pronounced shock, thereby eliminating or arresting unusual movement of the car body. The springs prevent severe tire and body strains and are also a protection to the driving mechanism.

What I claim is:

1. In a device of the class described, a vehicle body, an axle, a plurality of springs carried by the axle, a supplementary spring connected with each of the springs first mentioned, means for connecting one end of each supplementary spring with the body, a spring extending transversely of the body and connecting the opposite ends of the supplementary springs with each other, and a means connected with the body and with the axle, and arranged to modify the tension of certain of the aforesaid springs, said means last mentioned including a spring having connection with the axle, a rod connected with the spring and means for controlling the movement of the rod and spring with reference to the body and limiting the movement of the latter in one direction.

2. In a device of the class described, a vehicle body, an axle, a plurality of springs carried by the axle, a supplementary spring connected with each of the springs first mentioned, means for connecting one end of each supplementary spring with the body, a spring extending transversely of the body and connecting the opposite ends of the supplementary springs with each other, and an adjustable means connected with the body and with the axle, and arranged to modify the tension of certain of the aforesaid springs, said means last mentioned including a spring having connection with the axle, a rod connected with the spring and means for controlling the movement of the rod and spring with reference to the body and limiting the movement of the latter in one direction.

3. In a device of the class described, a vehicle body, an axle, springs carried by the axle, said springs having elliptical form, a supplementary spring connected with each of the springs first mentioned, the central portion of the supplementary spring being located adjacent the main axis of the elliptical spring, a spacing member connecting the supplementary spring with the elliptical spring, means connecting corresponding ends of the elliptical springs with each other, and independent means connecting the body with the axle, the means last mentioned including a principal spring, a device secured to the body and provided with an opening therein, a rod connected with the spring and passing through said opening, a supplemental spring between the device secured to the body and the principal spring, and means for preventing movement of the rod in one direction with reference to the device last mentioned.

4. In a device of the class described, a body, an axle, a plurality of springs carried thereby, a supplementary spring associated with each of the aforesaid springs, and having connection at one end with the body, a hanger for connecting the supplementary springs with the remaining springs, a spring extending transversely of the body at the rear and having connection with the supplementary springs, a collar carried by the axle, a coil spring rigidly connected with the collar, a stem carried by the upper end of the coil spring, and means for adjustably supporting the stem with reference to the body.

5. In a device of the class described, a body, an axle, a plurality of springs mounted thereon, a supplementary spring connecting each of the aforesaid springs with the body, means connecting corresponding ends of the supplementary springs with each other at the rear of the body, a device carried by the axle, a resilient device connected therewith, a coil spring connected with the resilient device, a stem carried by the latter, an adjustable member for varying the tension of the coil spring, a second coil spring carried by the stem, a device carried by the body and arranged to guide the said stem, the second coil spring being located between the device and the coil spring first mentioned, and having greater resiliency than the latter.

In testimony whereof I affix my signature in presence of two witnesses.

DUANE L. POTTER.

Witnesses:
EDWARD T. FENWICK,
GEORGE H. MACDONALD.

---

Copies of this patent may be obtained for five cents each, by addressing the "Commissioner of Patents, Washington, D. C."